United States Patent [19]

Roiz

[11] 4,208,077
[45] Jun. 17, 1980

[54] CONTINUOUS CONTACT BALL AND ROLLER BEARING

[76] Inventor: Ernest Roiz, 1936-B 94th Ave., Oakland, Calif. 94603

[21] Appl. No.: 6,556

[22] Filed: Jan. 25, 1979

Related U.S. Application Data

[63] Continuation of Ser. No. 824,719, Aug. 15, 1977, abandoned.

[51] Int. Cl.² .................... F16C 19/20; F16C 19/49
[52] U.S. Cl. .................................. 308/200; 308/206
[58] Field of Search ............. 308/199, 200, 206, 209, 308/215, 196

[56] References Cited

U.S. PATENT DOCUMENTS

| | | | |
|---|---|---|---|
| 258,413 | 5/1882 | Griffith | 308/215 |
| 1,287,225 | 12/1918 | Cheney | 308/200 |
| 1,289,062 | 12/1918 | Westman | 308/200 |
| 1,443,115 | 1/1923 | Breese | 308/200 |
| 1,505,311 | 8/1924 | Callaghan | 308/206 |
| 1,953,550 | 4/1934 | Brühl | 308/200 |
| 2,061,653 | 11/1936 | French | 308/206 |
| 2,581,722 | 1/1952 | Simmons | 308/206 |
| 2,854,299 | 9/1958 | Drutowski | 308/200 |

Primary Examiner—Frederick R. Schmidt
Attorney, Agent, or Firm—Warren, Chickering & Grunewald

[57] ABSTRACT

A bearing composed of concentric radially spaced circular inner and outer races confined in a common plane for relative rotation by sets of rolling members having rolling contact with the races and with each other, the parts being dimensioned to provide substantially slack-free engagement with the members of one set maintaining separation of adjacent pairs of members of the other set, and with the races and members being formed for mutual support and retention in a common plane of rotation.

2 Claims, 5 Drawing Figures

CONTINUOUS CONTACT BALL AND ROLLER BEARING

This is a continuation of application Ser. No. 824,719, filed Aug. 15, 1977 now abandoned.

BACKGROUND OF THE INVENTION

1. Field of the Invention

The invention relates to ball and roller bearings

2. Description of Prior Art

A common form of ball bearing comprises concentric radially-spaced circular inner and outer bearing races with a plurality of balls mounted in rolling engagement therebetween. In order to maintain the balls against contact with each other, it is common to mount the balls in a cage-like structure which maintains a positive separation between the balls. Of course, frictional losses are sustained in the rolling contact between the balls and the cage compartments and various structures have been proposed to eliminate the requirement for the cage. Of the prior art developed in a search, the most pertinent are U.S. Pat. Nos. 1,443,115; 1,287,225; 1,289,062; 1,953,550; 2,581,722; and 2,854,299. These patents show bearings of a nature only generally similar to that herein shown, lacking specific features of advantage referred to in the Abstract, and hereinafter further described and claimed.

SUMMARY OF THE INVENTION

An object of the present invention is to provide a bearing of a character described which is constructed to provide a system of rolling elements and races with all of the parts positively supported both axially and circumferentially for movement under frictionless rolling pressure.

Another object of the present invention is to provide a bearing of the character above which is of rugged construction capable of supporting substantial axial load with minimum end play, while at the same time preserving the free-running, frictionless engagement of the parts.

A further object of the present invention is to provide a bearing of the character described in which all of the parts are of a form adapted for low cost mass production and in which the design affords easy and ready assembly, all cooperating to provide a bearing of highest quality at modest cost.

Still another object of the present invention is to provide a bearing of the above character which is adapted for construction as either a ball- or roller-type bearing.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

DETAILED DESCRIPTION OF THE INVENTION

Figure 1:
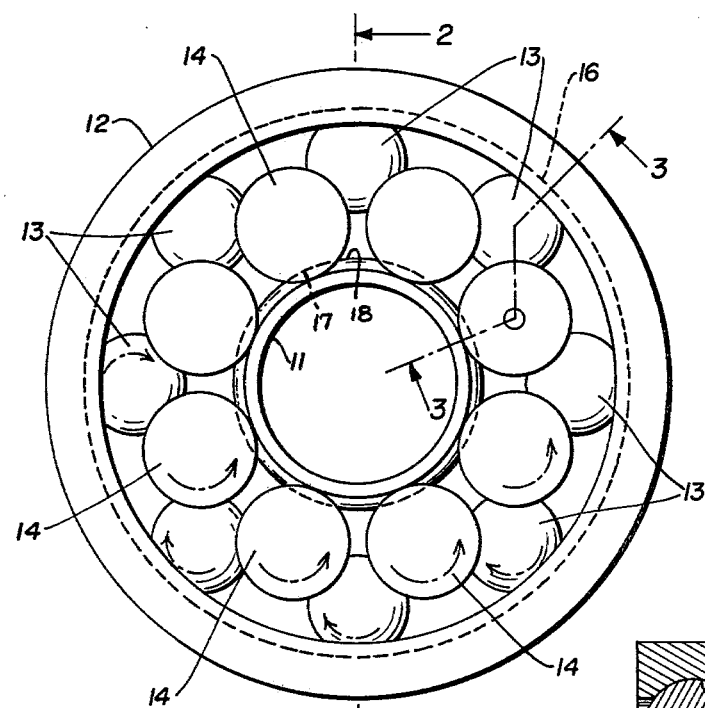
FIG. 1 is a side elevation of a bearing constructed in accordance with the present invention.
Figure 2:
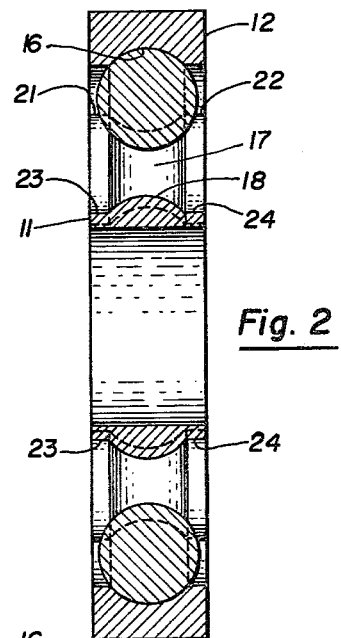
FIG. 2 is a cross-sectional view taken substantially on the plane of line 2—2 of FIG. 1.

With reference to the accompanying drawing, the bearing of the present invention comprises, briefly, concentric, radially spaced inner and outer races 11 and 12; a plurality of circumferentially spaced rolling members 13 of circular form mounted in rolling contact with race 12; a plurality of circumferentially spaced rolling members 14 mounted in rolling contact with race 11 and with members 13; the races and members being dimensioned to provide substantially slack-free engagement with one of members 13 mounted in rolling contact with and between and maintaining separation of each adjacent pair of members 14, and one of members 14 being mounted in rolling contact with and between and maintaining separation of each adjacent pair of members 13; the races and members being formed for mutual axial support for retention of the races and rolling members in a common plane of rotation.

In accordance with the present invention, retention of all of the parts in a common plane is accomplished by forming one of the races 11-12 and one set of members 13-14 with similar annular recesses, see recesses 16 and 17; forming the other race with an annular rib, see rib 18, mating in rolling engagement with recesses 17; and forming the other set of members 13-14 of annular convex form mating and mounting in rolling engagement with race and member recesses 16 and 17. In the form of the invention illustrated in FIGS. 1-5, recesses 16 and 17 and rib 18 are of circular form viewed in an axially extending plane and have similar radii of curvature; and the other of the members comprise spheres of common radii of curvature substantially equal to the common radius of curvature of the recesses so that all of the parts interfit in mating engagement.

In the form of the invention illustrated in FIGS. 1-5, annular recess 16 is formed as an internal annular groove in the outer race 12, and rib 18 is formed as an exterior annular protrusion on inner race 11. Accordingly, the outer set of members 13 are here round bearing balls which roll in recess 16 and are, in turn, supported interiorly within recesses 17 provided by members 14, the latter being positioned with recesses 17 in rolling contact around rib 18. Members 14 are thus spool-shaped, having their medial portion formed with recess 17 and having end shoulders 21 and 22 of cylindrical form. It will further be noted that race 11 is formed with cylindrical lands 23 and 24 on opposite sides of rib 18 and positioned in rolling engagement with shoulders 21 and 22.

As will be understood, the radial positioning of the balls and spools may be with the spools internally of the balls, as illustrated in FIGS. 1-5, or reversed, with the spools externally of the balls, in which event annular recess 16 will be provided on inner race 11 and annular rib 18 will be provided on the internal periphery of outer race 12. In either case, the balls and spools and races are in mutual contact-supporting relation, the spools maintaining a separation between the balls, and the balls maintaining a separation between the spools, and the contacting surfaces of the races, balls and spools all moving by essentially frictionless rolling pressure engagement of the same lineal speed so that there is no drag resistance present in the bearing. For example, considering clockwise rotation of inner race 11 with respect to outer race 12, spool members 14 will rotate in a counterclockwise direction and balls 13 will rotate in a clockwise direction as indicated by arrows in FIG. 1. Assuming a stationary positioning of outer race 12, ball bearings 13 will roll freely around the interior peripheral recess 16 in race 12. At the same time, the interfitting and mating surfaces securely lock the bearing races against relative axial displacement, thus providing a bearing capable of supporting substantial axial load with minimum end play, while at the same time preserving the free-running engagement of the parts.

Figure 3:
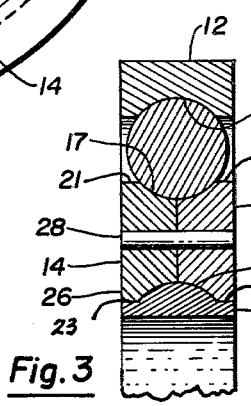
FIG. 3 is a fragmentary cross-sectional view taken substantially on the plane of line 3—3 of FIG. 1.

Assembly of the bearing may be accomplished in various ways. A preferred structure is illustrated in FIG. 3, where one of the spool members 14 is split in half to provide axially attached sections 26 and 27 cooperatively providing complementary portions of recess 17 and which may be attached in any suitable manner as by rivet 28 extending axially through the sections. All of the parts may be assembled, as illustrated, with the split spool member 14 being inserted last and fastened together to securely position all of the rolling members in properly spaced, slack-free engagement.

Figure 4:
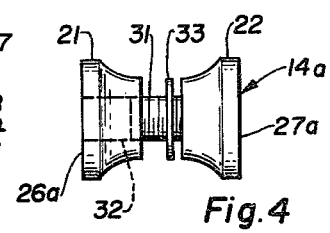
FIG. 4 is a side elevation of a modified part of the bearing.
Figure 5:
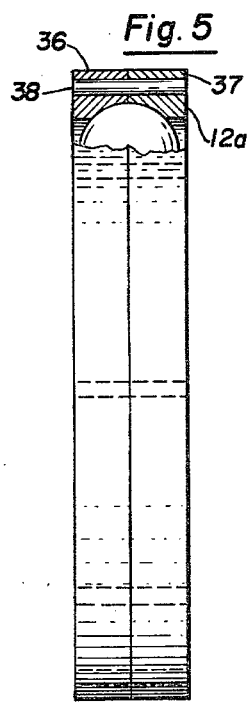
FIG. 5 is an end elevation partially in section showing a modified form of the bearing.

An alternate means of attaching the two sections 26a and 27a of spool member 14a is illustrated in FIG. 4, wherein one of the sections 27a is formed with a threaded axially extending stud 31 and the other section 26a is formed with a threaded bore 32 receiving stud 31 and affording adjustable spacing of the sections. One or more shims 33 may be mounted between the sections so as to provide a precise fitting with the rolling members 13. The sections may be held in adjustment by spot welding the stud in position or by using a jamb nut, or the like. Another mode of assembly of the parts is illustrated in FIG. 5, wherein one of the races, here outer race 12a, is composed of axially attached sections 36 and 37, which may be held in attached position by rivets 38.

What is claimed is:

1. A bearing comprising:
   concentric radially spaced circular inner and outer races mounted for rotation around a common axis and in a common plane perpendicular to said axis;
   a first of said races being formed in said plane with an annular recess of segmental circular form in cross section;
   a plurality of bearing balls dimensioned and mounted for rolling engagement in said recess;
   a second of said races being formed in said plane with an annular convex rib confronting said recess and of circular segmental form in cross section, said rib having a radius of curvature similar to the radii of curvature of said recess and balls, said second race being formed with annular cylindrical lands concentric to said axis and on opposite axial sides of said rib;
   a plurality of substantially spool-shaped bearing members each having a medial portion formed with an annular recess of circular cross section dimensioned and mounted for rolling engagment on said rib, said last-named recesses each having a radius of curvature similar to the radius of curvature of said balls and receiving said balls therein for rolling contact, said members having cylindrical shoulders at their opposite ends dimensioned and positioned in rolling engagement on said lands; and
   the number and dimensions of said balls and members providing slack-free engagement between said races, balls and members with one of said balls being mounted in rolling contact with and between and maintaining separation of each adjacent pair of members, and one of said members being mounted in rolling contact with and between and maintaining separation of each adjacent pair of said balls and with all of said balls in simultaneous continuous and exclusive rolling contact with said first race and said members, and all of said members in simultaneous continuous and exclusive rolling contact with said second race and said balls.

2. The structure of claim 1, at least one of said members being medially sectioned perpendicular to its axis to provide axially opposed sections cooperatively defining said medial portion recess; and
   means attaching said member sections and including an insertable shim to provide adjustment of the axial spacing therebetween for precise fitting of said races, balls and members to maintain said slack-free engagement.

* * * * *